(12) United States Patent
Tsai et al.

(10) Patent No.: US 9,045,359 B2
(45) Date of Patent: Jun. 2, 2015

(54) REVERSE OSMOSIS NEGATIVE-ION WATER DISPENSER

(71) Applicants: Chen-Sheng Tsai, Guangdong (CN);
Qi-Ming Xia, Guangdong (CN);
Tie-Gang Chen, Guangdong (CN); Qin Zhou, Guangdong (CN)

(72) Inventors: Chen-Sheng Tsai, Guangdong (CN);
Qi-Ming Xia, Guangdong (CN);
Tie-Gang Chen, Guangdong (CN); Qin Zhou, Guangdong (CN)

(73) Assignee: Guangdong Pinshine Environmental Technologies Co., Ltd, Guangdong (CN)

( * ) Notice: Subject to any disclaimer, the term of this patent is extended or adjusted under 35 U.S.C. 154(b) by 347 days.

(21) Appl. No.: 13/684,585

(22) Filed: Nov. 26, 2012

(65) Prior Publication Data

US 2013/0220903 A1    Aug. 29, 2013

(51) Int. Cl.
*C02F 1/44*    (2006.01)
*C02F 1/68*    (2006.01)
*C02F 9/00*    (2006.01)
*C02F 1/28*    (2006.01)

(52) U.S. Cl.
CPC . *C02F 1/441* (2013.01); *C02F 1/68* (2013.01); *C02F 2209/42* (2013.01); *C02F 1/283* (2013.01); *C02F 9/005* (2013.01); *C02F 2209/02* (2013.01); *C02F 2307/10* (2013.01)

(58) Field of Classification Search
None
See application file for complete search history.

(56) References Cited

U.S. PATENT DOCUMENTS

2013/0115335 A1 *    5/2013    Tsai ............................... 426/66

FOREIGN PATENT DOCUMENTS

WO    WO 8808737 A  *  11/1988

* cited by examiner

*Primary Examiner* — Terry Cecil

(57) ABSTRACT

A reverse osmosis negative-ion water dispenser comprising a polypropylene filter element, a granular active carbon filter element and a compressed active carbon filter element inside a housing; a low pressure switch, a booster pump, an inlet solenoid valve, an RO filter bottle, an RO membrane and two water outlets for concentrated water and pure water respectively are also provided, wherein the water outlet for concentrated water is connected with a flush solenoid valve and a waste water proportioner assembly, the water outlet for pure water is connected with a storage tank through a high pressure switch and a float switch; the storage tank is provided with a high-low level three-line water level switch and connected to a combined hot and cold exchange tank. A negative-ion generating device comprising a solenoid valve, a fast heating equipment and a negative-ion filter device is provided to generate negative-ion.

5 Claims, 2 Drawing Sheets

REVERSE OSMOSIS NEGATIVE-ION WATER DISPENSER

BACKGROUND OF THE INVENTION

The present invention relates to a water dispenser, and specifically relates to a reverse osmosis negative-ion water dispenser that is capable of obtaining drinking water through direct tap water processing.

In the prior art, since many water dispensers can only be applied for treated purified water or spring water and further provide outlets for cold water and hot water respectively, they are limited in usage. Although there are also some water dispensers that can treat tap water, the drinking water obtained through water processing is poor in quality.

BRIEF SUMMARY OF THE INVENTION

The objective of the present invention is to provide a reverse osmosis negative-ion water dispenser that is capable of obtaining drinking water with high quality through direct tap water processing, aiming at the above-mentioned drawbacks of the water dispenser in the prior art.

According to an aspect, a reverse osmosis negative-ion water dispenser is provided, which comprises a housing, wherein a polypropylene (PP) filter element, a granular active carbon filter element and a compressed active carbon filter element are arranged inside the housing in the processing sequence of water purification; a low pressure switch is arranged between the PP filter element and the granular active carbon filter element; filtered tap water flows into a booster pump through an inlet solenoid valve; the booster pump is connected with an RO filter bottle at its water outlet end; the RO filter bottle is equipped with an RO membrane inside and disposed with two water outlets for concentrated water and pure water respectively, wherein the water outlet for concentrated water is connected with a flush solenoid valve as well as a waste water proportioner assembly, and the water outlet for pure water is connected with a storage tank through a high pressure switch and a float switch consecutively; the storage tank is provided with a high-tow level three-line water level switch and its water outlet on the bottom is connected to a water inlet of a combined hot and cold exchange tank; the water flowing out of the exchange tank through its water outlet is passed to a fast heating equipment through a solenoid valve; the water outlet of the exchange tank is connected to a negative-ion generating device, whose water outlet is connected with the inlet of a winding tube in the hot and cold exchange tank; the outlet of the winding tube is connected with an assembly of PP cotton and ceramic filter element; and the water outlet of the assembly of PP cotton and ceramic filter element is connected with a cold tank of which the water outlet end is connected with a cold-water faucet.

The negative-ion generating device comprises an electromagnetic pump and a fast heating equipment connecting to the electromagnetic pump; the water outlet end of the fast heating equipment is connected with a three-way pipe, one end of which is connected with a hot-water faucet and another end of which is connected with the water inlet of the negative-ion filter device, whose outlet is connected to the inlet of the winding tube in the hot and cold exchange tank.

Tap water firstly passes through a perforated spile and then passes through the PP filter element, the granular active carbon filter element and the compressed active carbon filter element consecutively; wherein the low pressure switch is arranged between the PP filter element and the granular active carbon filter element. The tap water filtered by the three filter elements flows into the booster pump through the inlet solenoid valve, which is further pumped into the RO filter bottle after being pressurized by the booster pump. The RO filter bottle is equipped with the RO membrane inside and disposed with two water outlets for concentrated water and pure water respectively. Herein, on one hand, the concentrated water goes through the flush solenoid valve as well as the waste water proportioner assembly, and it is then discharged into a sewer or a collecting device for concentrated water by a water pipe connected with the perforated spile; on the other hand, the pure water goes into the storage tank by passing through the high pressure switch and the float switch. The storage tank is equipped with the high-low level three-line water level switch. When the water level of the storage tank reaches a certain value, a hot tank and a refrigeration compressor are able to work by energization. The water outlet on the bottom of the storage tank is connected to a combination of hot and cold exchange tank, while some winding stainless steel tubes are provided within the hot and cold exchange tank. After the pure water enters the hot and cold exchange tank, it is provided to the fast heating equipment through a solenoid valve in real time. The fast heating equipment is disposed with three temperature probes which are respectively in charge of detecting the water inlet temperature, the water outlet temperature and the surface temperature of the fast heating equipment. In this case, if the water inlet temperature exceeds a set value, the fast heating equipment and the corresponding solenoid valve will stop working to protect the solenoid valve; if it is below a set value, the water output of the solenoid valve will decrease. On the other hand, if the water outlet temperature exceeds a set value, the fast heating equipment will stop working or the water output of the solenoid valve will increase; if it is below a set value, the water output of the solenoid valve will decrease. Moreover, if the surface temperature of the fast heating equipment exceeds a set value, such equipment will stop working to protect itself from overheating.

When the hot-water faucet is opened, the fast heating equipment starts working to provide hot water. When the cold-water faucet is opened, the fast heating equipment instead stops working, in which case the heated pure water will pass through the negative-ion filter tank to become negative-ion water. Such kind of water then goes into the winding tube inside the hot and cold exchange tank and is cooled therein. Subsequently, it flows into the cold tank after passing through the assembly of PP cotton and ceramic filter element. Finally, the negative-ion water flows out through the cold-water faucet.

The effect of the assembly of PP cotton and ceramic filter element is as follows: it can remove some spilled negative-ion filter material coming from the preceding processing section by filtration. For this purpose, a drainage solenoid valve is connected between the assembly of PP cotton and ceramic filter element and the cold tank. The negative-ion filter material to be removed is discharged through a water pipe connected with the perforated spile.

If the water pressure is too low or the water supply is cut off, the low pressure switch will switch off and the booster pump will stop working.

If the water level inside the storage tank is below the lowest one, the power supply of the fast heating equipment and the refrigeration compressor will be turned off. If the water level inside the storage tank reaches a certain one, the power supply of the fast heating equipment and the refrigeration compressor will be switched on.

DETAILED DESCRIPTION OF THE INVENTION

Figure 1:
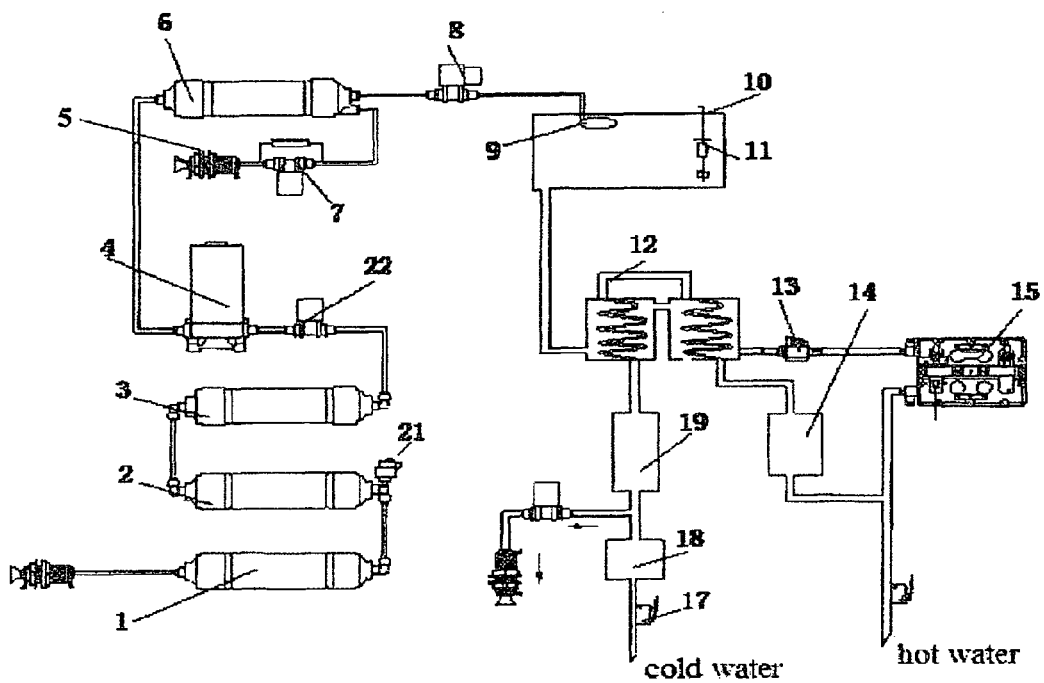
FIG. 1 is a schematic diagram for connection relation of components of the present invention in accordance with the water processing flow.
Figure 2:
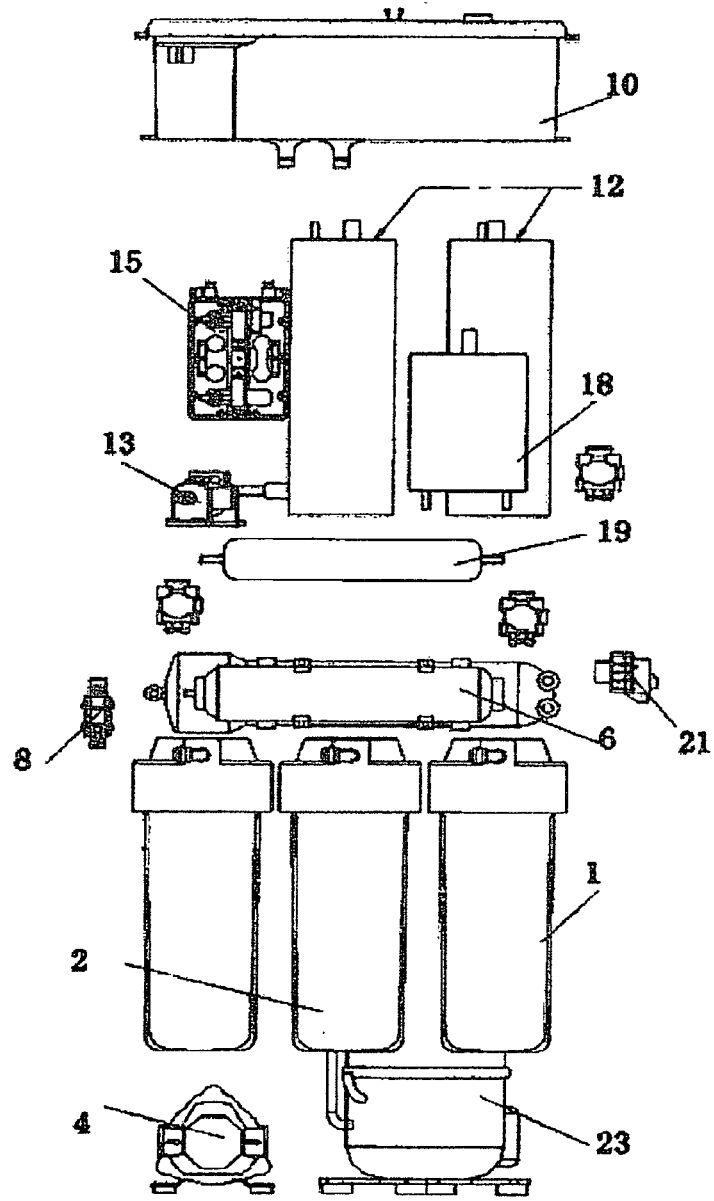
FIG. 2 is a structural diagram for components of the present invention in accordance with the assembly layout.

Referring to FIGS. 1 and 2, a reverse osmosis negative-ion water dispenser is constructed. It comprises a housing, inside which a PP filter element 1, a granular active carbon filter element 2 and a compressed active carbon filter element 3 are arranged in the processing sequence of water purification. A tow pressure switch 21 is further arranged between the PP fitter element 1 and the granular active carbon filter element 2. Filtered tap water passes through an inlet solenoid valve 22 and then flows into a booster pump 4 which is connected with an RO filter bottle 6 at its water outlet end. The RO filter bottle 6 is equipped with an RO membrane inside and disposed with two water outlets for concentrated water and pure water respectively. Wherein the outlet for concentrated water is connected with a flush solenoid valve 5 as well as a waste water proportioner assembly 7, and the outlet for pure water is connected with a storage tank 10 through a high pressure switch 8 and a float switch 9 consecutively. The storage tank is provided with a high-low level three-line water level switch 11 and its water outlet on the bottom is connected to a combined hot and cold exchange tank 12 provided with a winding stainless steel pipe inside. The water flowing out of the combined hot and cold exchange tank 12 through one of its water outlets is passed to a fast heating equipment 15 through a solenoid valve 13. The water outlet end of the fast heating equipment 15 is connected with a hot-water faucet. The winding pipe in the combined hot and cold exchange tank 12 is connected with an assembly of PP cotton and ceramic filter element 19 at its water outlet, while the water outlet of the assembly of PP cotton and ceramic filter element 19 is then connected with a cold tank 18 for storing negative-ion water. The cold tank is also provided with a winding stainless steel tube inside that is connected with a compressor 23. The water outlet end of the cold tank 18 is connected with a cold-water faucet 17. When the cold-water or the hot-water faucet is pressed, a micro switch is triggered to control the working of the fast heating equipment 15 and the corresponding solenoid valve 13.

In the above-mentioned reverse osmosis negative-ion water dispenser, the fast heating equipment 15 is a kind of liquid heater and is disposed with three temperature probes which are respectively a probe for water inlet temperature, a probe for water outlet temperature and a probe for surface temperature of fast heating equipment. In this case, if the water inlet temperature exceeds a set value, the fast heating equipment and the corresponding solenoid valve will stop working to protect the solenoid valve; if it is below a set value, the water output of the solenoid valve will decrease. On the other hand, if the water outlet temperature exceeds a set value, the fast heating equipment will stop working or the water output of the solenoid valve will increase; if it is below a set value, the water output of the solenoid valve will decrease. Moreover, if the surface temperature of the fast heating equipment exceeds a set value, such equipment will stop working to protect itself from overheating.

In the above-mentioned reverse osmosis negative-ion water dispenser, a negative-ion filter device 14, comprising stainless steel tank, filter, upper protective shell and lower protective shell, is set between the combined hot and cold exchange tank 12 and the fast heating equipment 15.

In the above-mentioned reverse osmosis negative-ion water dispenser, the negative-ion generating device comprises an electromagnetic pump and a fast heating equipment 15 connecting to the electromagnetic pump; the water outlet end of the fast heating equipment 15 is connected with a three-way pipe, one end of which is connected with a hot-water faucet and another end of which is connected with the water inlet of the negative-ion filter device 14, whose outlet is connected to the inlet of the winding tube in the hot and cold exchange tank 12.

In the above-mentioned reverse osmosis negative-ion water dispenser, a combined filter of PP cotton and ceramic film is set between the winding tube in the hot and cold exchange tank 12 and the cold tank 18.

In the above-mentioned reverse osmosis negative-ion water dispenser, the negative-ion generating device which consists of solenoid valve 13, fast heating equipment 15 and negative-ion filter device can generate negative-ion constantly.

By using the above-mentioned reverse osmosis negative-ion water dispenser, negative-ion drinking water which is suitable for direct drinking can be obtained, and the negative-ion drinking water obtained is better than pure water.

In the above-mentioned reverse osmosis negative-ion water dispenser, in the combined hot and cold exchange tank 12, some hot water can flow out of the hot-water faucet in the event that the water dispenser has been working for a while and the fast heating equipment 15 is not working. In this case, the temperature of the hot water is not very high.

What is claimed is:

1. A reverse osmosis negative-ion water dispenser comprising a housing, wherein a polypropylene (PP) filter element, a granular active carbon fitter element and a compressed active carbon filter element are arranged inside the housing in the processing sequence of water purification; a low pressure switch is arranged between the PP filter element and the granular active carbon filter element; filtered tap water flows into a booster pump through an inlet solenoid valve; the booster pump is connected with an RO filter bottle at its water outlet end; the RO filter bottle is equipped with an RO membrane inside and disposed with two water outlets for concentrated water and pure water respectively, wherein the water outlet for concentrated water is connected with a flush solenoid valve as well as a waste water proportioner assembly, and the water outlet for pure water is connected with a storage tank through a high pressure switch and a float switch consecutively; the storage tank is provided with a high-low level three-line water level switch and its water outlet on the bottom is connected to a water inlet of a combined hot and cold exchange tank; the water flowing out of the exchange tank through its water outlet is passed to a fast heating equipment through a solenoid valve; the water outlet of the exchange tank is connected to a negative-ion generating device, whose water outlet is connected with the inlet of a winding tube in the hot and cold exchange tank; the outlet of the winding tube is connected with an assembly of PP cotton and ceramic filter element; and the water outlet of the assembly of PP cotton and ceramic fitter element is connected with a cold tank of which the water outlet end is connected with a cold-water faucet.

2. The reverse osmosis negative-ion water dispenser of claim 1, wherein a negative-ion filter device, comprising stainless steel tank, filter, upper protective shell and lower protective shell, is set between the combined hot and cold exchange tank and the fast heating equipment.

3. The reverse osmosis negative-ion water dispenser of claim 2, wherein the negative-ion generating device comprises an electromagnetic pump and a fast heating equipment connecting to the electromagnetic pump; the water outlet end of the fast heating equipment is connected with a three-way pipe, one end of which is connected with a hot-water faucet and another end of which is connected with the water inlet of the negative-ion filter device, whose outlet is connected to the inlet of the winding tube in the hot and cold exchange tank.

4. The reverse osmosis negative-ion water dispenser of claim 3, wherein the fast heating equipment is a liquid heater and is disposed with three temperature probes which are respectively a probe for water inlet temperature, a probe for water outlet temperature and a probe for surface temperature of fast heating equipment.

5. The reverse osmosis negative-ion water dispenser of claim 1, wherein a combined filter of PP cotton and ceramic film is set between the winding tube in the hot and cold exchange tank and the cold tank.

* * * * *